United States Patent

[11] 3,626,279

[72] Inventor Charles D. Walden
31145 E. Hiway 99, Redlands, Calif. 92373
[21] Appl. No. 37,636
[22] Filed May 15, 1970
[45] Patented Dec. 7, 1971

[54] METAL DETECTOR UTILIZING RADIO RECEIVER AND HARMONIC SIGNAL GENERATOR
6 Claims, 5 Drawing Figs.

[52] U.S. Cl. .......... 324/3, 324/41, 325/434
[51] Int. Cl. .......... G01v 3/12
[50] Field of Search .......... 324/3, 6, 41; 325/434

[56] References Cited

UNITED STATES PATENTS

| | | | |
|---|---|---|---|
| 3,492,564 | 1/1970 | Baker | 324/3 |
| 3,525,046 | 8/1970 | Bourget | 325/434 |

OTHER REFERENCES

Miessner, B. F., Simplified Metal Locator, Radio Electronics Sept. 1962 pp. 33–35.

Benrey, Ronald M. A Treasure Finder You Can Build Popular Science July 1966 pp. 110–114.

*Primary Examiner*—Gerard R. Strecker
*Attorney*—Herbert E. Kidder

ABSTRACT: A metal detector using an ordinary radio receiver and a signal generator having its fundamental and second harmonic frequencies located equidistantly on either side of the frequency of the local oscillator of the radio. The fundamental and second harmonic of the generator are beat against the frequency of the local oscillator, producing two difference signals that are amplified and rebeat together to produce and audio signal. Frequency change in the signal of the generator due to inductance of metal is multiplied threefold in audio output, which triples sensitivity as compared with other detectors. The search coil comprises a printed circuit board having concentric coil circles on one side and radial shielding lines on the other.

INVENTOR.
CHARLES D. WALDEN
BY Herbert E. Kidder
AGENT

INVENTOR.
CHARLES D. WALDEN
BY
Herbert E. Kidder
AGENT

METAL DETECTOR UTILIZING RADIO RECEIVER AND HARMONIC SIGNAL GENERATOR

BACKGROUND OF THE INVENTION

The present invention relates to BFO (beat frequency oscillator) metal detectors, and more specifically to a new and improved metal detector using an ordinary A.M. radio receiver, search coil, and a signal generator having rather special characteristics, whereby a sensitivity tripling effect is obtained.

In prior BFO metal detectors, two signals are beat together, and a difference signal produced and amplified. In some cases, radio broadcast signals have been used as one of the reference signals, while in other cases signal generators have been used in which the fundamental frequency is beat against the other signal. This type of detector is characterized by one-to-one sensitivity; that is to say, one cycle of change in the search coil signal produces one cycle of change in the audio signal.

SUMMARY OF THE INVENTION

The primary object of the present invention is to provide a new and improved metal detector in which the sensitivity is tripled (or more) as compared with prior detectors. This desirable result is brought about by beating the fundamental and second harmonic frequencies of a signal generator against a reference signal having a frequency preferably midway between said fundamental and harmonic, and then rebeating the difference signals together.

Another important object of the invention is to provide a metal detector of the class described, which is extremely simple and inexpensive to manufacture, reliable, and convenient and easy to use. In this connection, one feature of the invention is that it uses a printed circuit search coil of novel design, having concentric coil circles on one side and radial ground capacitance shielding lines on the other. This arrangement provides maximum effectiveness of the search coil, in which the RF field is concentrated into a cone above and below the coil, with good shielding from ground capacitance. Another feature of the invention is that it uses an inexpensive transistorized radio receiver as part of the operating mechanism, and such radios are available on the market at this time for only a few dollars each.

A further object of the invention is to provide a unique mode of operation for metal detectors, wherein the fundamental and second harmonic frequencies of a signal generator are mixed with the signal of an oscillator whose frequency lies midway between said fundamental and said harmonic, and the resultant difference frequencies are then mixed again and amplified to produce an audible signal, the frequency of which changes three (or more) times as much as the fundamental frequency of the signal generator is changed by the inductance effect of nearby metal.

Still another object of the invention is to provide a BFO metal detector which can also be used in the transmitter-receiver null mode of operation for locating larger masses of metal or minerals at a greater depth than with the BFO mode of operation.

These and other objects and advantages of the present invention will become apparent to those skilled in the art from the following detailed description of the preferred embodiment thereof, with reference to the accompanying drawings.

DESCRIPTION OF THE PREFERRED EMBODIMENT

Figures 1, 5:
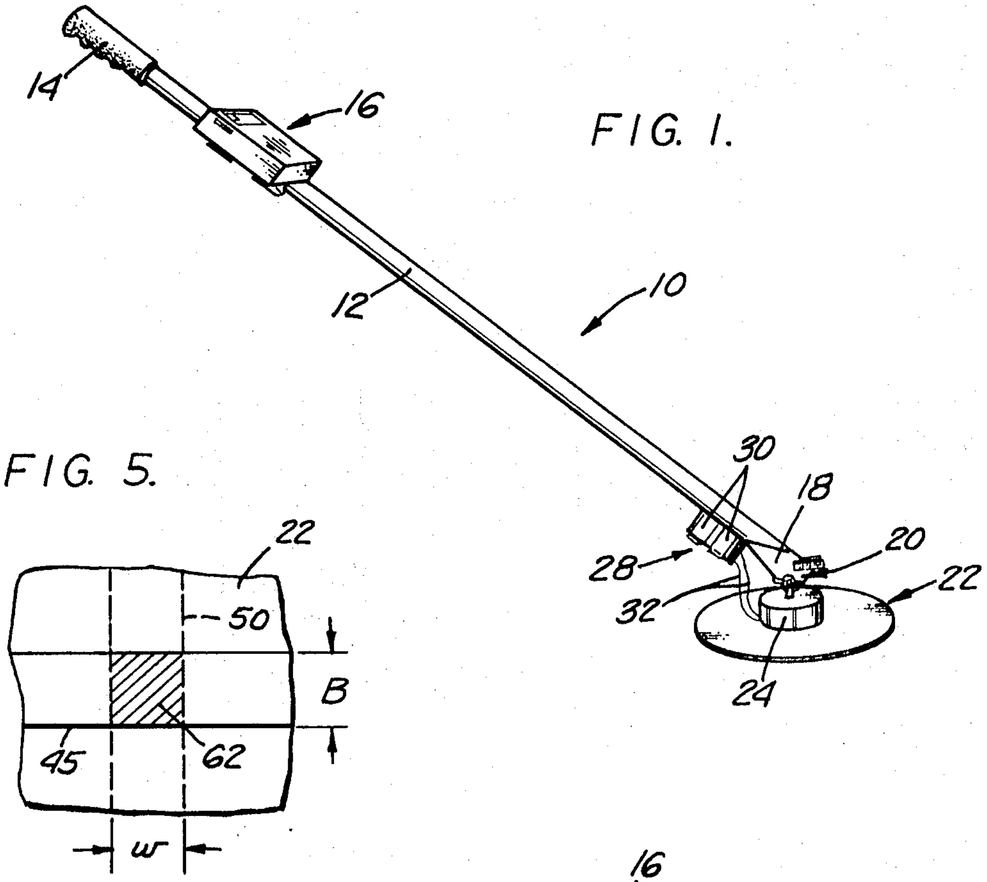
FIG. 1 is a perspective view of a metal detector embodying the principles of the invention.
FIG. 5 is an enlarged fragmentary view of a portion of the search coil.

In the drawing, the metal detector of the present invention is designated in its entirety by the reference numeral 10, and comprises a tubular aluminum handle 12 having a hand grip 14 telescoped over the upper end thereof. Mounted on the upper portion of the handle 12 is a transistor radio receiver 16 of the type to receive A.M. broadcasts.

Figure 2:
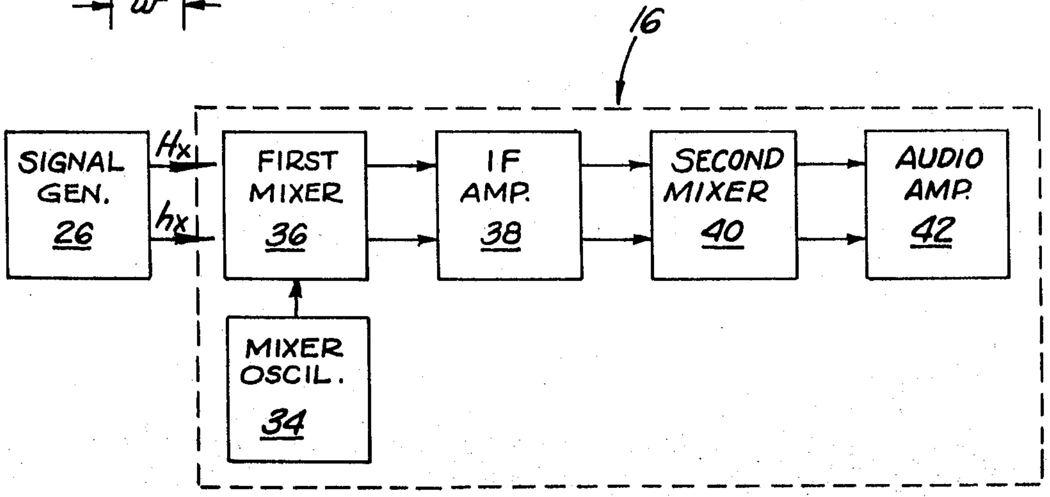
FIG. 2 is a block diagram, showing in a diagrammatic way how the various frequencies are generated, mixed, and the difference signals are remixed and amplified.

The bottom end of the tubular handle 12 is flattened at 18, and pivotally connected to the flattened portion by a screw and wing nut 20 is a search coil 22 having a cylindrical housing 24 mounted on the top side thereof at the center, which encloses the signal generator 26 (FIG. 2). Batteries 28 are secured by clamps 30 to the lower end of the handle 12 directly above the flattened portion 18, and the terminals of the batteries are joined by wires 32 and detachable connectors (not shown) to the signal generator 26.

As shown in FIG. 2, the radio 16 includes a tunable mixer oscillator 34, a first mixer 36, IF amplifier 38, a second mixer 40 (commonly called the detector stage), and stage), and audio amplifier 42. For normal broadcast reception, the oscillator 34 is tuned to oscillate at 455 kc. above the transmitted radio frequency, and this is mixed in the mixer 36 and the 455 kc. difference frequency is then fed to the IF amplifier.

In the present invention, the signal generator 26 is preferably designed to produce a 910 kc. signal, with a strong harmonic of 1,820 kc. The mixer oscillator 34 is then tuned to 1,365 kc. (i.e., 910 kc. on the radio receiver tuning dial), which is 455 kc. above the 910 kc. fundamental, and 455 below the 1,820 kc. harmonic. While the signal generator 26 has been described as having a fundamental frequency of 910 kc. and harmonic of 1,820 kc., it might also have a lower fundamental frequency with a lower harmonic of 910 kc. and a higher harmonic of 1,820. For that reason, the description that follows will use the symbol $x$ for the fundamental frequency of the signal generator 26; $hx$ for its lower harmonic; $Hx$ for its higher harmonic; and $C$ for the frequency of the mixer oscillator 34. In the present example, the fundamental frequency of the signal generator is 910 kc., and therefore both the $x$ and $hx$ have the same numerical value (i.e., 910 kc.). In the example, $C$=1,365 kc., and $Hx$=1,820. The signal from oscillator 34 is fed into the mixer 36 and mixed with both the 910 kc. $hx$ and 1,820 kc. H$x$.

If two sine waves are mixed, the sum and difference signals are produced. When all possible combinations of the sum and difference signals resulting from beating H$x$ and $hx$ against $C$ are considered, only four of them are of interest, the others being imaginary, outside of the tuned IF, or the audio range. These four might be represented by the parameters: (1) $Hx-C$; (2) $C-hx$; (3) $x(H+h)-2C$; and (4) $2C-x(H+h)$, wherein $H$ is the numerical value of the higher harmonic (in this case 2) and $h$ is the numerical value of the lower harmonic (in this case 1). The above parameters s hold true provided $Hx>C>hx$.

In the present invention, two signals of the same frequency are required to be passed by the IF amplifier 38, which is why the oscillator 34 is tuned so that its frequency falls midway between $Hx$ (1,820 kc.) and $hx$ (910 kc). Thus, $Hx-C=C-hx$. Also, the different frequencies must be the same as the frequency of the IF tuned amplifier, which is 455 kc. Thus, $I=Hx-C$ and $I -C -hx$, where $I$ equals the tuned frequency of the IF amplifier 38.

The two signals $Hx-C$ and $C-hx$ are amplified by the IF amplifier 38 and passed on to the second mixer 40. Here they are mixed together and produce the signal $x(H+h)-2C$ and $2C-x(H+h)$. The other possibilities fall outside of the area in which we are interested. One or the other of these equations will always be negative except at zero beat, where they are equal. Negative frequencies being impossible, our equation now becomes $Z=/x(H+h)-2C/$, where $Z$ is the output frequency. As $-2C$ is a constant, any change in $x$ will be multiplied by the sum of the harmonics used. For example, the fundamental ($h=I$) and second harmonic ($H=2$) would give a multiplication of 3.

Since audio frequencies (as compared with radio frequencies) are near zero, we can assume that $x(H+h)-2C=0$, which can be written: $C=x(H+h)/2$. This equation can be used to select the operating frequency of the mixer oscillator 34, whether IF amplifiers are used or not. Also, $x=2C/H+h$. When working with a given receiver, the knowns are $H$, $h$ and $I$, the unknowns are $x$ and $C$. Therefore, either $x$ or $C$ must be eliminated, and $x$ or $C$ can be written as follows: $C=I\ (H+h)/H-$ "and" $I=x(H-h)/2$.

In the example shown and described herein, $h=1$, $H=2$, and $I=455$ kc. Solving $C=I\ (H+h)/H-h$ we find that $C=1{,}365$ kc. Since $x=2C/H+h$ , $x=910$kc. Thus, by using an ordinary A.M. radio receiver and picking up the fundamental and second harmonic of an oscillator 26 operating at 910 kc., a frequency tripling action is obtained. For example, if the oscillator frequency is raised 1 kc. to 911 kc. by the presence of metal in the RF field of the search coil, the audio frequency will be changed 3 kc., as shown by solving the equation $Z=|x(H+h)-2C|$. With prior metal detectors, the audio frequency change for this same condition would be only 1 kc., which means that the sensitivity of the present metal detector is three times the sensitivity of prior detectors.

The increase in sensitivity can be made greater than 3 times the sensitivity of conventional detectors by using higher harmonics than $h=1$ and $H=2$. For example, using a signal generator having a fundamental frequency of 455 kc. a second harmonic ($h=2$) of 910 kc., and a fourth harmonic ($H=4$) of 1,820 kc., the sensitivity would be multiplied by 6. On the other hand, it is possible to tune the mixer oscillator 34 to 455 kc., in which case the fundamental frequency (455 kc.) will pass right through the IF amplifier 38 and will then be beat against its second harmonic in the second mixer 40. This will not give as great an increase in sensitivity as is obtained with the oscillator 34 midway between $hx$ and H$x$. However, it does produce a tone that can be used.

The sensitivity tripling feature of the invention is extremely advantageous from the standpoint of manufacturing and use. Inexpensive transistor radios are available, which are eminently satisfactory for the purpose. All adjustments as to tone and volume are accomplished with existing controls on the radio. No alterations need be made in the radio, nor are there any electrical connections required. The radio is simply placed in the vicinity of the oscillator, and preferably on the handle 12, as shown in the drawing. The only additional requirement is the simple oscillator 26 operating in accordance with the teachings of this patent.

Figures 3, 4:
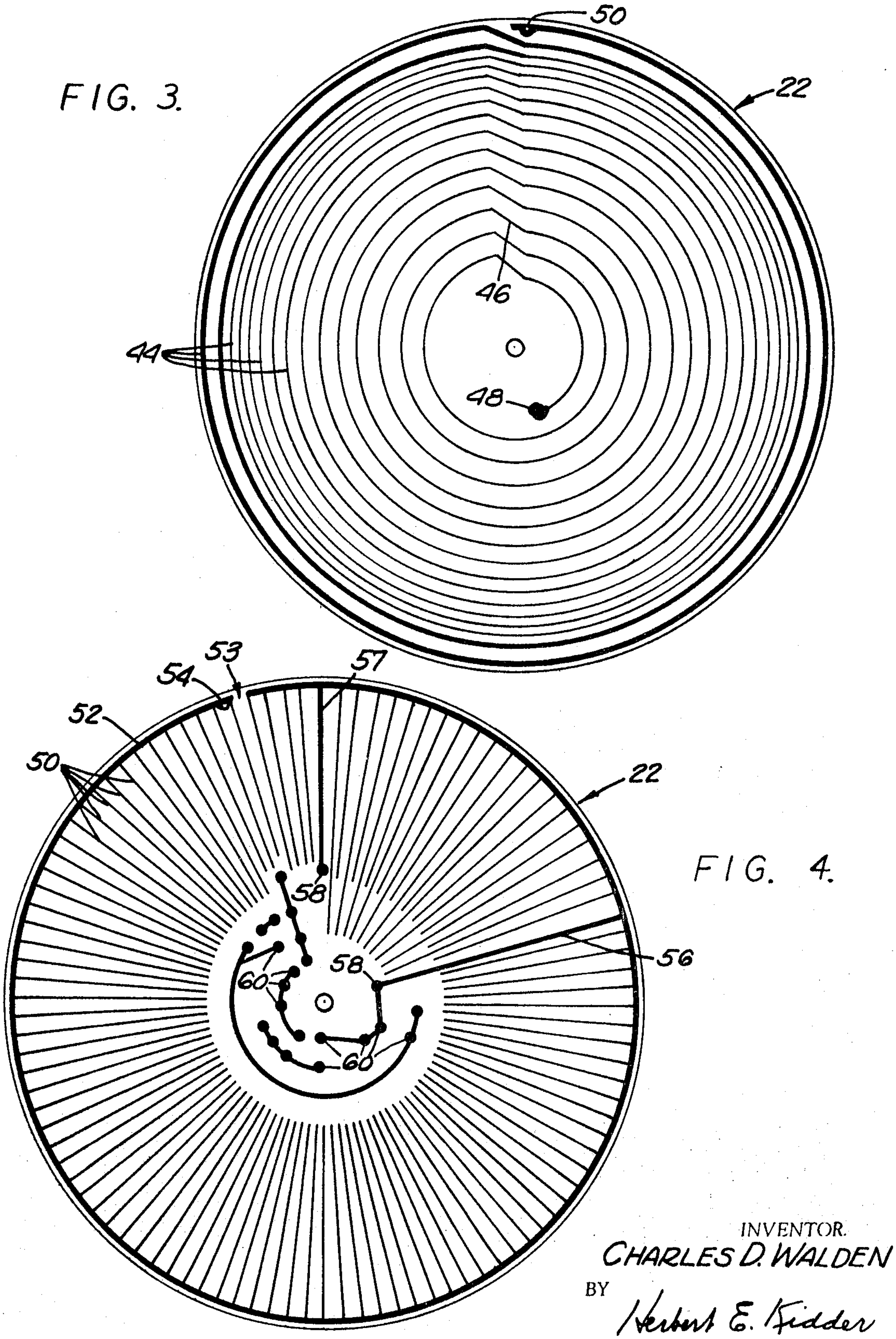
FIG. 3 is a view of the top side of the search coil, showing the printed circuit coil with its concentric rings.
FIG. 4 is a view of the bottom side of the search coil, showing the printed circuit shielding lines.

The second aspect of the invention pertains to the search coil 22, which is shown in FIGS. 3 and 4. The search coil is a flat, circular disk, a little more than 6½ inch in diameter, about one-sixteenth inch thick and preferably made of fiberglass and polyester resin. Printed on copper film on the top side of the disk is a coil circuit consisting of a plurality of concentric rings 44, spaced about three thirty-seconds inch apart, each of which is interrupted along one radial of the disk and is connected at that point by a short diagonal line 46 to the next adjoining ring. Thus, the rings 44 form a continuous, uninterrupted, substantially spiral coil extending all the way from the outer rim of the disk to a spot of copper 48 near the center, to which one wire leading from the output terminal of the signal generator 26 is soldered.

Printed on the bottom side of disk 22 is a grid of radial shielding lines 50, the outer ends of which run into and merge with a ring 52 extending around the perimeter of the disk. Ring 52 is interrupted at 53 and has a spot 54 which is connected through the disk by a wire and solder connection to a spot 55 on the outer end of coil 44, thereby grounding the outer end of the coil. Extending radially inward from ring 52 are two conductive lines 56, and 57, which terminate in round spots of copper 58 to which electrical connection is made from the signal generator 26 on the other side. Electrical connection is by wires passing through holes in disk 22 through the centers of spots 58, and the ends of the wires being then soldered to the spots. Other spots 60 of copper, some connected by circular lines and others by radial lines, form part of the printed circuit of the signal generator 26, none of which is germane to the invention. The disk 22 is drilled at its center to provide a mounting hole 62, through which a screw may be passed to secure the disk to the underside of the housing 24.

The search coil 22 is thus made entirely as a printed circuit board, with great savings in manufacturing costs. By placing the signal generator 26 in the center, with the coil spiraling outward to the perimeter, the search coil has maximum sensitivity to small objects.

One of the main problems with printed circuit search coils is that they are difficult to shield from ground capacitance. A spiral search coil has many advantages. It concentrates the RF field into a cone above and below the coil, which gives a concentrated field for detection of small objects. It also desensitizes the edge of the coil so that metal can be located next to additional metal. By a slight change in coil configuration from a spiral to concentric circles, together with the radial shield lines shown in FIG. 4, I have been able to maintain the advantages of a spiral and produce good shielding. The design of the radial shielding lines is based on the following two conditions, which are necessary: (1) the area of metal overlying the coil at right angles thereto must be kept to a minimum; and (2) there must be no completed paths for conduction of electrons.

Another important consideration for effective capacitance shielding is that the effective RF exposed area should equal the exposed shield area. By using concentric circles in conjunction with radial shielding lines, the area of shielding metal overlying the coil at right angles thereto is kept to a minimum. This is best shown in FIG. 5, where the area of shielding metal overlying the coil is shown as a cross-hatched area 62. The required shielding area can be obtained by increasing the number of radial shield lines 50.

The design of the coil and shield is governed by a number of considerations. Ideally, for proper shielding, $RFt=St$, where $RFt$ is the total effective exposed RF area, and $St$ is the area of exposed shield. Area $St=hwN$, where $h$ is the length of one shield line, $w$ is the width of the shield line, and $N$ is the number of shield lines. Area $Ct=LtB$, where $Ct$ is the area of exposed coil, $Lt$ is the total length of the coil line, and $B$ is the width of the coil line. $RFt=Ct+Y-V$, where $Y$ is the $RF$ exposed circuit area, and $V$ is a factor relative to decreasing $RF$ field near the edges of the coil. If RFt >St, inadequate shielding is obtained. If St >RFt, undesirable distortion of the RF field results. RFt should be at a minimum, so that there will be less to shield. For equal areas RFt and St, we find that $hwN=Ct+Y-V$. $Y$ and $V$ can easily be made equal in manufacturing, and therefore cancel out. Thus, $hwN=Ct$, which can be written: $N=Ct/hw$ .

The area $Ct$ of exposed coil should be reduced to a minimum $Ct=LtB$. $Lt$ has electrical limits, and $B$ has manufacturing limits. The term $h$ has a maximum limitation imposed by the radius of the coil, while $w$ has a minimum limitation governed by practical manufacturing limits. Thus, for a given coil, a certain number of shield lines will give the proper shielding with a minimum distortion of the RF field, and this number can be determined from the above equations. The arrangement of shield lines as shown in FIG. 4 can adequately shield the RF circuits without introducing undue field distortion. One important advantage of using concentric coil circles instead of a spiral curve is that perpendicularity of the shield lines with respect to the coil lines can be obtained with straight radial shield lines, instead of curved lines, which greatly simplifies design and calculation problems.

To use the metal detector of the present invention in the BFO mode, the apparatus is set up as shown in FIG. 1, and the hand grip 14 is held in one hand so that the search coil 22 is parallel to the ground. The radio receiver 16 is then tuned to around 910 kc. on the dial, until a tone signal is heard. As the radio is tuned through the tone signal, the signal decreases in frequency and volume until it fades out altogether and then reappears and increases in frequency. The point where the tone is not heard is called "zero-beat." The tuning dial of the radio is then tuned down from zero-beat, until a comfortable low tone is obtained. The search coil 22 is swept back and forth across the ground being searched, keeping the disk parallel to the ground. If the search coil 22 passes over an object of metal, the frequency of the signal generator 26 is altered by the inductance effect of the metal in the RF field, causing a clearly recognizable change in the tone signal over a relatively wide frequency range owing to the sensitivity tripling effect described earlier. The instrument will detect all metals (gold, silver, iron, etc.) through any nonconducting medium such as rock, sand, dirt, mud, concrete, asphalt, etc. Sensitivity of the instrument is so great in this mode of operation that the head of an eight-penny nail can be detected at a distance of over 3 inches, and a penny or a dime can be detected at over 6 inches. The characteristics of the RF field produced by the search coil 22 are such that metal can be located next to other metal. For example, coins buried next to reinforced buildings, or alongside iron pipes, can readily be detected.

When searching for a larger mass of metal, or mineral deposits, at depths of from 2 feet to over 20 feet, the detector 10 is used in the transmitter-receiver-null mode of operation. For this type of operation, the search coil 22 is adjusted to lie parallel to the handle 12. With the oscillator 26 operating, the radio receiver 26 is tuned to a frequency producing a tone signal. The handle 12 is then grasped at the point of balance, about halfway between the radio and the search coil, and is held parallel to the ground, with the search coil facing the ground. Holding the handle still, the radio is rocked from side to side on its mounting clamps until a point is found at which the signal fades out completely, regardless of how high the volume is turned. This is the null position. With the apparatus held in this position, it is carried over the area being searched. If a mass of metal or mineral deposit from 2 to over 20 feet below the surface is encountered, the tone will reappear. It is this reappearance of the tone signal that indicates the presence of metal or mineral. What is happening here is that the signal generator 26 radiates an RF field, which is picked up by the radio and beat against the mixer oscillator frequency 34, then passes through the IF amplifier 38, second mixer 40, and audio amplifier 42. The highly directional properties of the ferrite rod antenna in the transistor radio cause the signal to fade out when the radio is tuned to one particular position. This fadeout of the signal persists until the RF field is warped by the presence of a large mass of metal or mineral within a range of 2 to 20 feet, at which point the tone signal reappears. In this mode of operation, the frequency of the tone signal remains constant and the volume changes.

While I have shown and described in considerable detail what I believe to be the preferred embodiment of the invention, it will be understood by those skilled in the art that various changes may be made without departing from the broad scope of the invention as defined by the claims.

I claim:

1. A metal detector comprising, in combination:
- an A.M. radio receiver having a first mixer stage, a mixer oscillator feeding a signal into said first mixer, an IF amplifier stage, a second mixer, and an audio amplifier;
- a search coil; and
- an RF signal generator connected to said search coil and cooperating therewith to produce a concentrated, directional RF field, said signal generator having a lower harmonic frequency and a higher harmonic frequency, said higher harmonic frequency being higher than the frequency of said mixer-oscillator by an amount equal to the frequency for which said IF amplifier is tuned;
- said higher harmonic and said lower harmonic of said signal generator being beat against the signal of said mixer-oscillator in said first mixer to produce two sum and difference signals, which are then amplified in said IF amplifier, rebeat against one another in said second mixer, and amplified in said audio amplifier;
- the resultant audio signal from said audio amplifier being changed in frequency by an amount greater than the change in frequency of said signal generator caused by the inductive effect of metal in said RF field of said search coil.

2. A metal detector as in claim 1, wherein the operating frequency of said mixer-oscillator is midway between the frequencies of said lower and higher harmonics of said signal generator.

3. A metal detector as in claim 1, wherein the lower harmonic of the signal generator is 910 kc., the higher harmonic is 1,820 kc., and the operating frequency of said mixer-oscillator is 1,365 kc.; said IF amplifier being tuned to 455 kc.; and the resultant audio signal being changed in frequency by an amount triple the change in frequency of said signal generator.

4. A metal detector as in claim 2, wherein the amount of change in the frequency of the audio output signal is a multiple of the change in frequency of said signal generator, the multiplying factor being a numerical value equal to the sum of the harmonic values (i.e., first harmonic equals 1, second harmonic equals 2, etc.).

5. A metal detector as in claim 1, wherein said search coil comprises a printed circuit, printed on opposite sides of a dielectric plate, said search coil having a series of concentric cycles on one side of said plate, each of which circles is interrupted at one point, one end of each interrupted circle being connected to the next adjacent outer circle, and the other end being connected to the next adjacent inner circle, and said plate having capacitance shielding on the other side thereof comprising a plurality of radial lines having their outer ends connected together, said radial lines radiating from the center of said concentric circles and being perpendicular to said circles at the point of intersection; said signal generator being mounted at the center of said series of concentric circles and connected to the innermost circle.

6. A metal detector for use both in the BFO mode of operation and in the transmitter-receiver-null mode of operation, said detector comprising:
- a handle having a search coil adjustably attached to one end thereof;
- an A.M. radio receiver mounted for angular adjustment on said handle near the other end thereof, said radio receiver having a first mixer, mixer-oscillator, IF amplifier, second mixer, and audio amplifier;
- and a signal generator mounted on said search coil and electrically connected thereto so as to produce an RF field;
- said signal generator producing an RF signal having lower and higher harmonics spaced equidistantly on opposite sides of the tuned frequency of said mixer-oscillator, the frequency difference between said lower harmonic and said mixer-oscillator, and between said higher harmonic and said mixer-oscillator, being equal to the frequency to which said IF amplifier is tuned;
- said detector being operable in the BFO mode of operation by beating said lower harmonic and said higher harmonic against the frequency of said mixer-oscillator in said first mixer, amplifying the sum and difference signals in said IF amplifier, rebeating the sum and difference signals together in said second mixer, and amplifying the resultant signal in said audio amplifier;
- said detector being operable in the transmitter-receiver-null mode of operation by adjusting the position of said search coil to make it parallel to said handle, tuning said radio to produce a tone signal, adjusting the angular position of said radio on said handle until the highly directional characteristics of the ferrite antenna of said radio causes said tone signal to fade out (zero-beat), and then carrying said handle in the horizontal position with said search coil facing downwardly, said tone signal becoming audible again when the RF field of said search coil is warped by the presence of metal or minerals.

* * * * *

UNITED STATES PATENT OFFICE
CERTIFICATE OF CORRECTION

Patent No. 3,626,279 Dated December 7, 1971

Inventor(s) Charles D. Walden

It is certified that error appears in the above-identified patent and that said Letters Patent are hereby corrected as shown below:

Col. 2, line 23, should read --41 (commonly called the detector stage), and an--.

Col. 6, line 30 (Claim 5), "cycles" should read --circles--.

Signed and sealed this 16th day of May 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE : 1969 O—366-334